United States Patent
Kaderabek

(12) 
(10) Patent No.: US 11,628,742 B2
(45) Date of Patent: Apr. 18, 2023

(54) METHOD AND DEVICE FOR CHARGING A BATTERY FOR A MEANS OF TRANSPORT

(71) Applicant: Robert Bosch GmbH, Stuttgart (DE)

(72) Inventor: Fritz Kaderabek, Wiener Neudorf (AT)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 17/106,743

(22) Filed: Nov. 30, 2020

(65) Prior Publication Data

US 2021/0162882 A1 Jun. 3, 2021

(30) Foreign Application Priority Data

Nov. 28, 2019 (DE) .......................... 102019218489.8

(51) Int. Cl.
*H02J 7/00* (2006.01)
*B60L 58/20* (2019.01)
*B60L 53/66* (2019.01)
*B60L 58/16* (2019.01)
*B60L 58/12* (2019.01)
*H01M 10/44* (2006.01)

(52) U.S. Cl.
CPC .............. B60L 58/20 (2019.02); B60L 53/66 (2019.02); B60L 58/12 (2019.02); B60L 58/16 (2019.02); H02J 7/00041 (2020.01); H02J 7/00714 (2020.01); H02J 7/007194 (2020.01); B60L 2210/10 (2013.01); H01M 10/44 (2013.01)

(58) Field of Classification Search
CPC .......... B60L 58/12; B60L 58/16; B60L 58/20; B60L 53/66; B60L 2210/10; H02J 7/00041; H02J 7/00714; H02J 7/007194; H01M 10/44

USPC .......................................................... 320/137
See application file for complete search history.

(56) References Cited

U.S. PATENT DOCUMENTS

| 2011/0221392 A1* | 9/2011 | Gale | ....................... B60L 53/14 320/109 |
| 2014/0253051 A1* | 9/2014 | Hu | ....................... H02J 7/00712 320/162 |
| 2019/0302192 A1* | 10/2019 | Gokyu | ..................... B60L 1/003 |

FOREIGN PATENT DOCUMENTS

| CN | 108700636 A | 10/2018 |
| DE | 1027146 A1 | 3/1992 |
| EP | 3136539 A1 | 9/2013 |
| JP | 2004045235 A | 2/2004 |

\* cited by examiner

*Primary Examiner* — Zixuan Zhou

(74) *Attorney, Agent, or Firm* — Michael Best & Friedrich LLP

(57) ABSTRACT

A method and to a device for charging a battery for a means of transport. The method comprises the steps of: ascertaining an open-circuit voltage of the battery (30) on the basis of a voltage ramp that is generated by a controllable DC-to-DC converter (40) that is electrically connected to the battery (30), ascertaining a differential internal resistance of the battery (30) on the basis of a predefined model for the differential internal resistance of the battery (30) and the open-circuit voltage, ascertaining a target value for an output voltage of the DC-to-DC converter (40) on the basis of the open-circuit voltage of the battery (30), a predefined charging current of the battery (30) and the differential internal resistance of the battery (30), and charging the battery (30) using the target value for the output voltage in the DC-to-DC converter (40).

18 Claims, 1 Drawing Sheet

METHOD AND DEVICE FOR CHARGING A BATTERY FOR A MEANS OF TRANSPORT

BACKGROUND OF THE INVENTION

The present invention relates to a method and to a device for charging a battery for a means of transport.

In electrically driven means of transport, low-voltage loads of the means of transport are generally supplied via a DC-to-DC converter that converts a voltage from a high-voltage battery of the means of transport into a suitable low voltage. A low-voltage battery (for example a 12 V or a 24 V battery) is additionally usually also charged via the DC-to-DC converter. In low-voltage batteries that do not have a battery sensor, an output voltage of the DC-to-DC converter is usually established using a modeled battery temperature. A charging current is not controlled in this case. Only by using an appropriate battery sensor, which entails relatively high costs, is it made possible to improve a charging strategy for the low-voltage battery. As an alternative to using a battery sensor, which provides for example information about a current and/or a voltage and/or a temperature and/or a state of charge (SOC for short), the prior art sometimes uses a current limit of the DC-to-DC converter in order to limit a charging current of the battery. However, when using such a method, it is necessary to know a load current, which also has to be relatively constant. In the case of a known load current, the current limit of the DC-to-DC converter may be established appropriately such that a desired charging current arises at the low-voltage battery.

JP 2004-045235 describes a method for estimating an internal resistance of a battery on the basis of current values, voltage values and temperature values, these being measured at three different times.

CN 108700636 describes a device for determining degradation of secondary batteries, comprising a multiplicity of voltage sensors, a measurement current device and a controller. Each voltage sensor is provided with a sensor-specific wireless communication device that is configured so as to transmit respective measured values to the controller. The controller calculates an internal resistance of respective batteries on the basis of the measured values and determines the degradation of a respective battery on the basis of the internal resistance.

SUMMARY OF THE INVENTION

One object of the present invention is to provide a method and a device for charging a battery for a means of transport, which method and device are in particular able to be implemented without using a battery sensor and without knowledge of a load current.

According to a first aspect of the present invention, what is proposed is a method for charging a battery for a means of transport. The means of transport may be for example a road vehicle (for example motorcycle, car, transporter, lorry) or a rail vehicle or an air vehicle/aircraft and/or a watercraft. The battery may in particular be a low-voltage battery or a low-voltage starter battery of the means of transport in the form of a lead accumulator battery. As an alternative, the battery may also be a lithium-ion accumulator battery or a type of battery different therefrom. A nominal voltage of the battery may correspond for example to a voltage in the range from 6 V to 48 V and preferably a voltage in the range from 12 V to 24 V or a voltage different therefrom.

In a first step of the method according to the invention, an open-circuit voltage of the battery is ascertained on the basis of a voltage ramp that is generated by a controllable DC-to-DC converter that is electrically connected to the battery. To this end, the DC-to-DC converter may be connected in terms of information to an evaluation unit according to the invention, which may be a component of the DC-to-DC converter itself, a component of the battery or a component of a further controller of the means of transport. The connection in terms of information of the evaluation unit to the DC-to-DC converter may be implemented for example on the basis of a bus system (for example CAN, LIN, MOST, FlexRay, etc.) of an on-board power system of the means of transport. The evaluation unit may thereby be given the ability to drive the DC-to-DC converter by way of appropriate control signals, in order for example to specify a target value for an output voltage and/or an output current of the DC-to-DC converter. The evaluation unit may additionally be configured so as to receive current values for the output voltage and/or the output current of the DC-to-DC converter from the DC-to-DC converter. The output voltage and the output current should be understood here to mean those variables that are provided to the battery (that is to say the low-voltage battery) by the DC-to-DC converter at an output side of the DC-to-DC converter. Electrical energy provided at an input side of the DC-to-DC converter may be provided in particular by a high-voltage battery of the means of transport, which may be used inter alia as electrical energy store for a drivetrain of the (electrically driven) means of transport. The battery is thus configured, via the DC-to-DC converter, so as to be charged by way of the electrical energy from the high-voltage battery. As an alternative or in addition to the high-voltage battery, a generator provided in the means of transport may also provide the electrical energy for charging the battery. In such a case, the generator, as an alternative or in addition to the high-voltage battery, may be electrically connected to the input side of the DC-to-DC converter. The voltage ramp may preferably be executed in a region that contains the nominal voltage of the battery. The open-circuit voltage of the battery may be established during the execution of the voltage ramp at a time at which no current is flowing between the output of the DC-to-DC converter and the battery. A voltage value received by the evaluation unit from the DC-to-DC converter at this time may be stored in a storage unit connected internally and/or externally to the evaluation unit for subsequent processing by the evaluation unit.

In a second step of the method according to the invention, a differential internal resistance of the battery is ascertained on the basis of a predefined model for the differential internal resistance of the battery and the open-circuit voltage. The model for the differential internal resistance may for example likewise be stored in the storage unit connected to the evaluation unit. The model may in particular comprise a characteristic curve and/or a characteristic diagram that represents a change in a voltage of the battery with respect to a change in a discharging current of the battery. The characteristic curve and/or the characteristic diagram may for example be ascertained in the course of a development phase of the battery and/or of the means of transport using the battery, and be stored in respective storage units of respective evaluation units in the course of series production of the battery and/or of the means of transport. On the basis of the value for the open-circuit voltage ascertained in the first step of the method according to the invention, a value, corresponding to the open-circuit voltage, for the differential internal resistance of the battery may be ascertained by the evaluation unit on the basis of the model for the differential internal resistance.

In a third step of the method according to the invention, a target value for an output voltage of the DC-to-DC converter is ascertained on the basis of the open-circuit voltage of the battery, on the basis of a predefined charging current of the battery and on the basis of the differential internal resistance of the battery. The predefined charging current may be for example a value, stored in the storage unit, for a recommended charging current of the battery, the magnitude of which may be oriented inter alia on the basis of a nominal capacity of the battery. The target value for the output voltage of the DC-to-DC converter may then be ascertained on the basis of the following equation:

$$U_A = U_0 + I_C * R_{diff},$$

wherein $U_A$ represents the target value for the output voltage of the DC-to-DC converter, $U_0$ represents the ascertained open-circuit voltage, $I_C$ represents the predefined charging current and $R_{diff}$ represents the ascertained differential internal resistance of the battery.

In a fourth step of the method according to the invention, the battery is charged using the target value for the output voltage in the DC-to-DC converter. In other words, the target value thereby ascertained for the output voltage of the DC-to-DC converter may be used to ensure that the battery is able to be charged by way of the predefined charging current.

It is pointed out that the method according to the invention is preferably able to be used in a charging phase of the battery with a constant charging current, but is not restricted to such a charging phase. The method may furthermore be repeated regularly or irregularly within such a charging procedure in order to ensure that the predefined charging current is able to be maintained even in the event of potentially changed boundary conditions (for example temperature and/or capacity of the battery, etc.).

It is likewise pointed out that a multiplicity of values for the predefined charging current may also be stored in the storage unit, from which multiplicity of values a respectively suitable predefined value for the predefined charging current may be used on the basis of respective boundary conditions that are present.

In one advantageous refinement of the present invention, the voltage ramp runs through a voltage range from 10 V to 14 V and preferably a voltage range from 10.8 V to 13 V, without thereby restricting the method according to the invention to the abovementioned voltage ranges. As an alternative or in addition, a size of the voltage ramp and/or an average value of voltage values of the voltage ramp are/is established on the basis of a previously ascertained value for the open-circuit voltage of the battery. The previously ascertained value for the open-circuit voltage may be stored in the storage unit connected to the evaluation unit and be read therefrom and used when required. By virtue of using the previously ascertained value for the open-circuit voltage, it is possible to reduce a size of the voltage ramp and thus shorten the procedure of ascertaining the open-circuit voltage of the battery.

In a further advantageous refinement of the present invention, the open-circuit voltage of the battery is ascertained and used again in response to a change in the output current of the DC-to-DC converter. The change in the output current may be recorded in the evaluation unit by virtue of the above-described connection in terms of information of the evaluation unit to the DC-to-DC converter. To this end, a predefined threshold value for the change in the output current of the DC-to-DC converter may preferably be stored in the storage unit connected to the evaluation unit, which threshold value may be compared with the currently present change in the output current by way of the evaluation unit. In the event that the currently present change in the output current exceeds the predefined threshold value, the method according to the invention may be performed again in order to ensure that the predefined charging current for the battery is able to be complied with.

In a further advantageous refinement of the present invention, the model for the differential internal resistance of the battery is checked for plausibility and/or adapted in a phase in which the open-circuit voltage is ascertained and/or there is a predefined energy draw from the battery. Such a predefined energy draw may be present for example when information about currently active consumers (for example an air-conditioning controller of the means of transport) and about their current and/or average energy consumption is present in the evaluation unit. Such information may be provided for example to the evaluation unit by the respective consumers via the on-board power system of the means of transport. As an alternative, predefined, average energy consumption values for respective consumers of the means of transport may also be stored in the storage unit of the evaluation unit, such that only one respective activation state of respective consumers needs to be transmitted to the evaluation unit via the on-board power system.

In a further advantageous refinement of the present invention, the model for the differential internal resistance of the battery additionally takes into account a current temperature of the battery, wherein the temperature is ascertained on the basis of a temperature measurement and/or on the basis of a temperature model for the battery. In the case of a temperature measurement, a temperature sensor of the battery and/or a temperature sensor in the vicinity of the battery may for example be connected in terms of information to the evaluation unit, such that the temperature information is able to be recorded and used in the evaluation unit. By virtue of ascertaining the temperature, influences of the temperature on the differential internal resistance of the battery are accordingly able to be taken into account, as a result of which it is made possible to more precisely determine the current target value for the output voltage of the DC-to-DC converter. More accurate compliance with the predefined charging current is thereby in turn able to be ensured.

In a further advantageous refinement of the present invention, the model for the differential internal resistance of the battery additionally takes into account a state of health of the battery. Since the internal resistance of the battery may for example increase as a function of a number of charging cycles that have already taken place and/or as a function of a previous usage time of the battery, it is thereby again possible to achieve more precise determination of the target value for the output voltage of the DC-to-DC converter and more exact compliance with the predefined charging current.

In a further advantageous refinement of the present invention, the model for the differential internal resistance is checked for plausibility and/or adapted in an external server on the basis of information from a multiplicity of means of transport. To this end, the means of transport involved in the method according to the invention may have respective wireless communication devices that are configured so as to set up a wireless communication connection with the external server (for example a mobile radio connection and/or a WLAN connection, etc.). The means of transport may thereby transmit respective information about ascertained battery states and/or states of charge to the server, such that the server is able to compare between this information. The model for the differential internal resistance of the battery may be adapted on the basis of this information by the server, when needed, to changed values in series production of the means of transport etc. in order to allow even more exact determination of the differential internal resistance. To this end, the server may transmit the adapted model to the multiplicity of means of transport by way of the wireless communication device, such that the adapted model may then be used in the multiplicity of means of transport instead of the previously used model.

According to a second aspect of the present invention, what is proposed is a device for charging a battery for a means of transport. The device comprises an evaluation unit that has a data input and a data output. The evaluation unit may be designed for example as an ASIC, FPGA, processor, digital signal processor, microcontroller or the like and be connected in terms of information to an internal and/or external storage unit. The evaluation unit is configured so as to ascertain, in connection with the data input, an open-circuit voltage of the battery on the basis of a voltage ramp that is generated by a controllable DC-to-DC converter that is electrically connected to the battery. The evaluation unit is furthermore configured so as to ascertain a differential internal resistance of the battery on the basis of a predefined model for the differential internal resistance and on the basis of the ascertained open-circuit voltage. The evaluation unit is additionally configured so as to ascertain a target value for an output voltage of the DC-to-DC converter on the basis of the open-circuit voltage of the battery, on the basis of a predefined charging current of the battery and on the basis of the differential internal resistance of the battery, and, in connection with the data output, to charge the battery using the target value for the output voltage in the DC-to-DC converter.

The device according to the invention is furthermore configured so as to perform a method according to the invention in accordance with the above description. The method may preferably be implemented in the form of a computer program that is able to be executed by the evaluation unit. The features, combinations of features and the resultant advantages correspond clearly to those explained in connection with the first-mentioned aspect of the invention, such that reference is made to the above explanations in order to avoid repetitions.

BRIEF DESCRIPTION OF THE DRAWINGS

Exemplary embodiments of the invention are described in detail below with reference to the accompanying drawing, in which.

DETAILED DESCRIPTION

Figure 1:
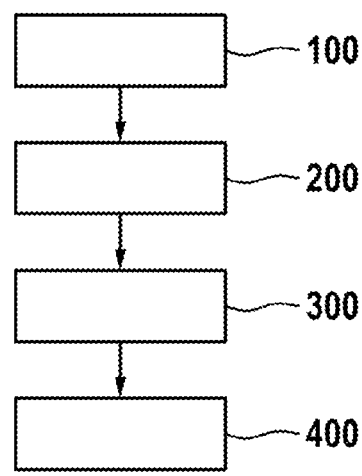
FIG. 1 shows a flowchart illustrating steps of one exemplary embodiment of a method according to the invention.

FIG. 1 shows a flowchart illustrating steps of one exemplary embodiment of a method according to the invention for charging a battery for a means of transport. In step 100 of the method according to the invention, an open-circuit voltage of a 12 V starter battery (here a lead accumulator battery) is ascertained on the basis of a voltage ramp that is generated by a controllable DC-to-DC converter that is electrically connected to the starter battery. The DC-to-DC converter is connected at input to a high-voltage battery of the means of transport, from which high-voltage battery the DC-to-DC converter is able to draw electrical energy in order to charge the starter battery. The open-circuit voltage is ascertained by way of an evaluation unit according to the invention, which is in this case a microcontroller and which is connected in terms of information to a control and read interface of the DC-to-DC converter. On the basis of execution of the voltage ramp, which runs through a voltage range from 10.8 V to 13 V, being initiated by the evaluation unit, at a voltage value of 12 V of the voltage ramp, the evaluation unit establishes that no current is flowing between the starter battery and an output side of the DC-to-DC converter. On this basis, the voltage value of 12 V is determined, in accordance with the method according to the invention, as the open-circuit voltage of the starter battery that needs to be ascertained. In step 200 of the method according to the invention, a differential internal resistance of the starter battery is ascertained on the basis of a predefined model for the differential internal resistance of the starter battery and the ascertained open-circuit voltage. The model is stored in a storage unit connected to the evaluation unit. In step 300 of the method according to the invention, a target value for an output voltage of the DC-to-DC converter is ascertained by way of the evaluation unit on the basis of the open-circuit voltage of the starter battery, on the basis of a predefined charging current of the battery and on the basis of the ascertained differential internal resistance of the starter battery. In step 400, the starter battery is charged using the target value for the output voltage in the DC-to-DC converter. To this end, the target value, ascertained by the evaluation unit, for the output voltage of the DC-to-DC converter is transmitted from the evaluation unit to the DC-to-DC converter and used thereby to adapt the output voltage.

Figure 2:
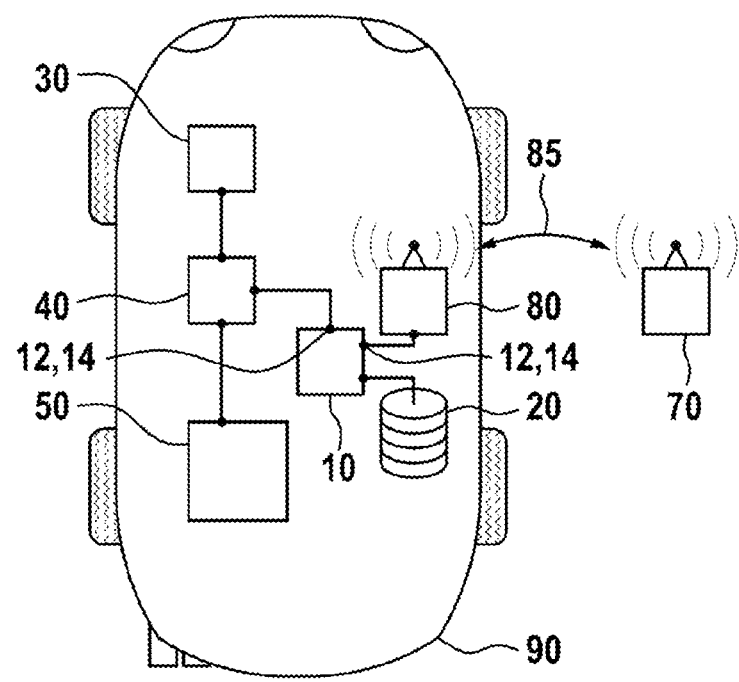
FIG. 2 shows a schematic overview of a device according to the invention in connection with a means of transport.

FIG. 2 shows a schematic overview of a device according to the invention in connection with a means of transport 90. The device comprises an evaluation unit 10 according to the invention, which has a data input 12 and a data output 14 and which is in this case an ASIC. The evaluation unit 10 is connected in terms of information to a storage unit 20 that is connected externally to the evaluation unit 10, in which storage unit data received and/or processed by the evaluation unit 10 may be stored for subsequent processing by the evaluation unit 10. The evaluation unit 10 is connected in terms of information to a DC-to-DC converter 40 of the means of transport 90 by way of the data input 12 and by way of the data output 14. An input side of the DC-to-DC converter 40 is electrically connected to a high-voltage battery 50 of the means of transport 90, whereas an output side of the DC-to-DC converter is connected to a 12 V battery 30 of the means of transport 90, which 12 V battery is in this case a starter battery. The DC-to-DC converter 40, in connection with the high-voltage battery 50 and being driven by the evaluation unit 10, is configured so as to charge the battery 30 with a predefined charging current. The evaluation unit 10 is additionally connected in terms of information to a wireless communication device 80 of the means of transport 90, which wireless communication device is in this case a mobile radio device, by way of the data input 12 and the data output 14. The evaluation unit 10 is configured, by way of the wireless communication device 80, so as to transmit information about a state and a charging procedure of the battery 30 to an external server 70 remote from the means of transport 90 via a wireless communication connection 85, or to receive an updated model for determining the differential internal resistance of the battery 30 from the external server 70. The device according to the invention is configured, on the basis of the above configuration, so as to execute an above-described method according to the invention for charging the battery 30.

The invention claimed is:

1. A method for charging a battery (30) for a means of transport (90), the method comprising:
   ascertaining (100) an open-circuit voltage of the battery (30) on the basis of a voltage ramp that is generated by a controllable DC-to-DC converter (40) that is electrically connected to the battery (30),
   ascertaining (200) a differential internal resistance of the battery (30) on the basis of a predefined model for the differential internal resistance of the battery (30) and the open-circuit voltage, wherein the predefined model for the differential internal resistance of the battery (30) is checked for plausibility and adapted in a phase in which the open-circuit voltage is ascertained and there is a predefined energy draw from the battery (30),
   ascertaining (300) a target value for an output voltage of the DC-to-DC converter (40) on the basis of
      the open-circuit voltage of the battery (30),
      a predefined charging current of the battery (30) and the differential internal resistance of the battery (30), and
   charging (400) the battery (30) using the target value for the output voltage in the DC-to-DC converter (40).

2. The method according to claim 1, wherein the battery (30) is a low-voltage battery that is charged via the DC-to-DC converter (40) by way of electrical energy from a high-voltage battery (50) of the means of transport (90).

3. The method according to claim 1, wherein
   the voltage ramp runs through a voltage range from 10 V to 14 V, and/or
   a size of the voltage ramp is established on the basis of a previously ascertained value for the open-circuit voltage of the battery (30).

4. The method according to claim 1, wherein the open-circuit voltage of the battery (30) is reached when no current is flowing between the DC-to-DC converter (40) and the battery (30).

5. The method according to claim 1, wherein the open-circuit voltage of the battery (30) is ascertained and used again in response to a change in an output current of the DC-to-DC converter (40).

6. The method according to claim 1, wherein the model for the differential internal resistance of the battery (30) additionally takes into account a current temperature of the battery (30), wherein the temperature is ascertained on the basis of
   a temperature measurement, and/or
   a temperature model for the battery (30).

7. The method according to claim 1, wherein the model for the differential internal resistance of the battery (30) additionally takes into account a state of health of the battery (30).

8. The method according to claim 1, wherein the model for the differential internal resistance is checked for plausibility and/or adapted in an external server (70) on the basis of information from a multiplicity of means of transport.

9. The method according to claim 1, wherein the differential internal resistance of the battery is ascertained in a charging phase with a constant charging current.

10. A device for charging a battery (30) for a means of transport (90), the device comprising:
    an evaluation unit (10),
    a data input (12), and
    a data output (14),
    wherein the evaluation unit (10) is configured
       to ascertain, in connection with the data input (12), an open-circuit voltage of the battery (30) on the basis of a voltage ramp that is generated by a controllable DC-to-DC converter (40) that is electrically connected to the battery (30),
       to ascertain a differential internal resistance of the battery (30) on the basis of a predefined model for the differential internal resistance and the open-circuit voltage, wherein the predefined model for the differential internal resistance of the battery (30) is checked for plausibility and adapted in a phase in which the open-circuit voltage is ascertained and there is a predefined energy draw from the battery (30),
       to ascertain a target value for an output voltage of the DC-to-DC converter (40) on the basis of
          the open-circuit voltage of the battery (30),
          a predefined charging current of the battery (30), and
          the differential internal resistance of the battery (30), and,
       in connection with the data output (14), to charge the battery (30) using the target value for the output voltage in the DC-to-DC converter (40).

11. The device according to claim 10, wherein the battery (30) is a low-voltage battery that is charged via the DC-to-DC converter (40) by way of electrical energy from a high-voltage battery (50) of the means of transport (90).

12. The device according to claim 10, wherein
    an average value of voltage values of the voltage ramp is established on the basis of a previously ascertained value for the open-circuit voltage of the battery (30).

13. The device according to claim 10, wherein the open-circuit voltage of the battery (30) is reached when no current is flowing between the DC-to-DC converter (40) and the battery (30).

14. The device according to claim 10, wherein the open-circuit voltage of the battery (30) is ascertained and used again in response to a change in an output current of the DC-to-DC converter (40).

15. The device according to claim 10, wherein the model for the differential internal resistance of the battery (30) additionally takes into account a current temperature of the battery (30), wherein the temperature is ascertained on the basis of
    a temperature measurement, and/or
    a temperature model for the battery (30).

16. The device according to claim 10, wherein the model for the differential internal resistance of the battery (30) additionally takes into account a state of health of the battery (30).

17. The device according to claim 10, wherein the model for the differential internal resistance is checked for plausibility and/or adapted in an external server (70) on the basis of information from a multiplicity of means of transport.

18. The device according to claim 10, wherein the differential internal resistance of the battery is ascertained in a charging phase with a constant charging current.

* * * * *